United States Patent [19]

Novak et al.

[11] Patent Number: 4,632,077
[45] Date of Patent: Dec. 30, 1986

[54] WINDOW-IN-VANE INTERRUPTER AND SWITCH PLATE ASSEMBLY FOR IGNITION DISTRIBUTOR

[75] Inventors: Robert J. Novak, Mount Clemens; Leonard J. Kronberger, Oak Park, both of Mich.

[73] Assignee: Chrysler Motors Corporation, Highland Park, Mich.

[21] Appl. No.: 782,757

[22] Filed: Oct. 1, 1985

[51] Int. Cl.⁴ ................................. F02P 1/00
[52] U.S. Cl. ........................ 123/146.5 A; 123/617; 208/14 DR; 208/19 R
[58] Field of Search ............. 123/146.5 A, 617; 200/19 DR, 19 R; 310/70 R

[56] References Cited

U.S. PATENT DOCUMENTS

| | | | |
|---|---|---|---|
| 3,163,700 | 12/1964 | Williamson | 123/146.5 A |
| 3,518,978 | 7/1970 | Schmiedel | 123/146.5 A |
| 3,542,976 | 11/1970 | Moray | 123/146.5 A |
| 3,752,139 | 8/1973 | Asplund | 123/146.5 A |
| 3,783,850 | 1/1974 | Habert | 123/146.5 A |
| 3,894,202 | 7/1975 | Campbell et al. | 123/146.5 A |
| 4,037,577 | 7/1977 | Gallo | 123/146.5 A |
| 4,082,926 | 4/1978 | Marks et al. | 123/146.5 A |
| 4,235,213 | 11/1980 | Jellissen | 123/146.5 A |

Primary Examiner—Raymond A. Nelli
Attorney, Agent, or Firm—Mark P. Calcaterra

[57] ABSTRACT

An interrupter and Hall Effect switch for generating a unique signal when the window-in-vane interrupts the Hall signal in an ignition distributor and is designed to synchronize the ignition and fuel pulses in a multi-point injected internal combustion engine.

6 Claims, 20 Drawing Figures

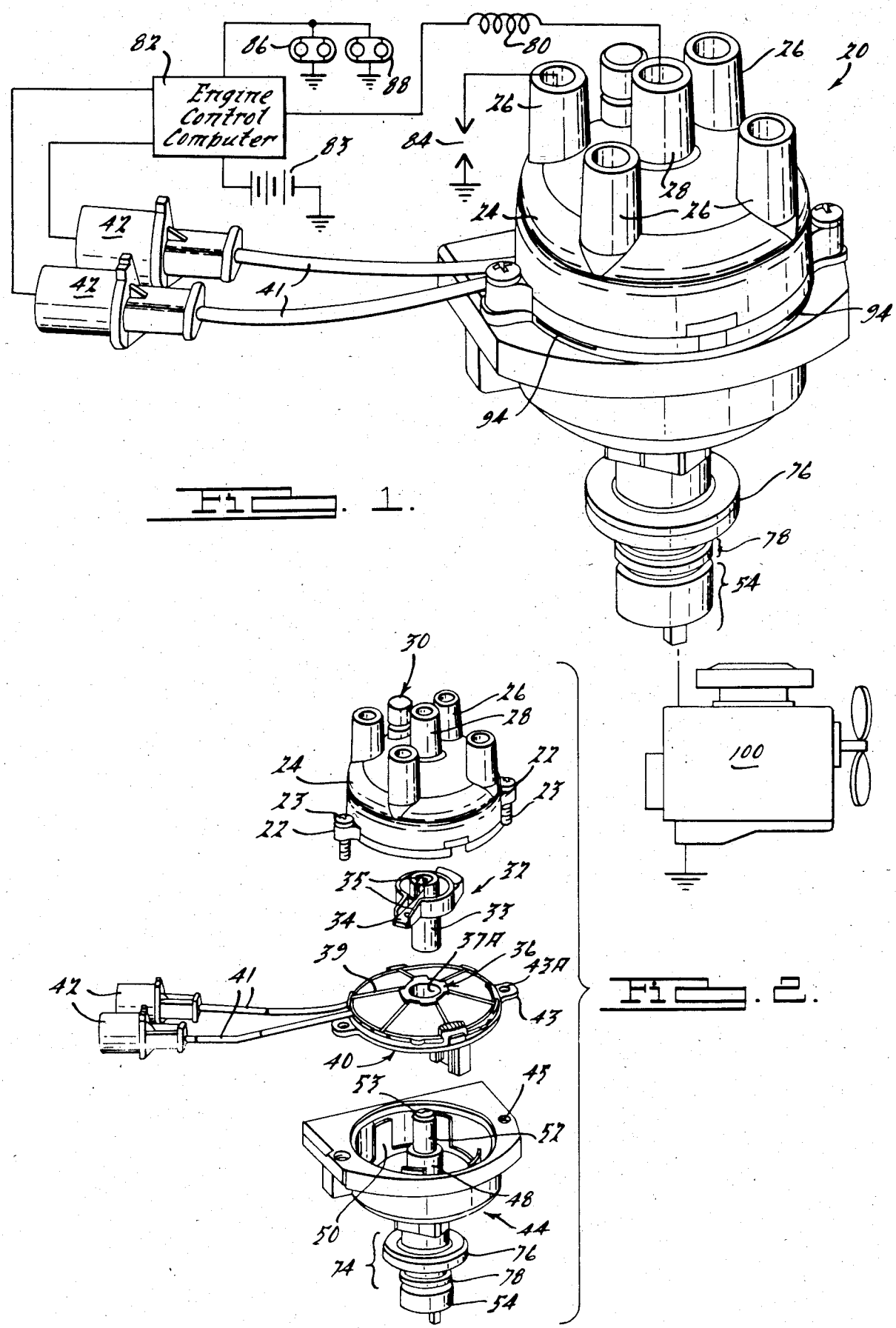

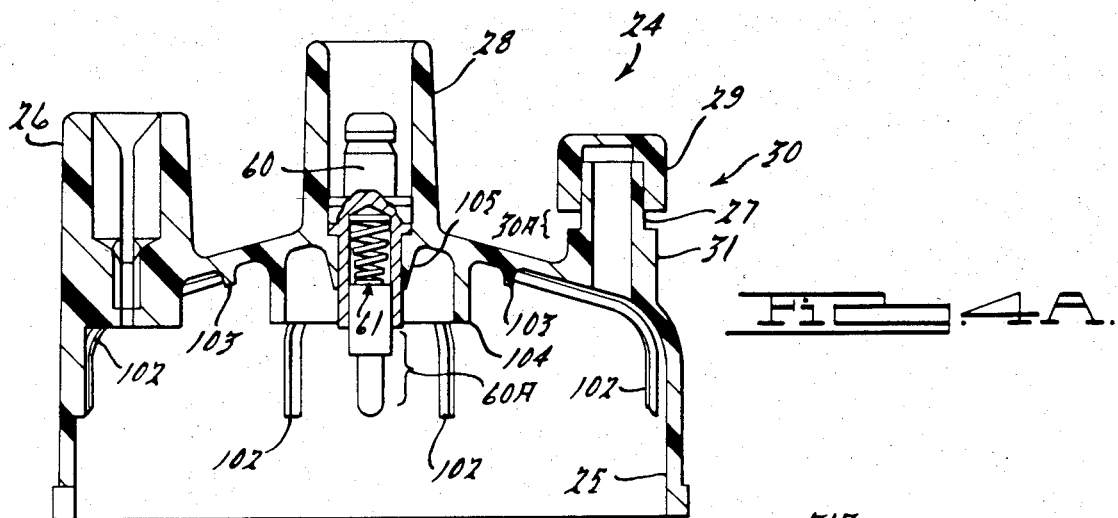
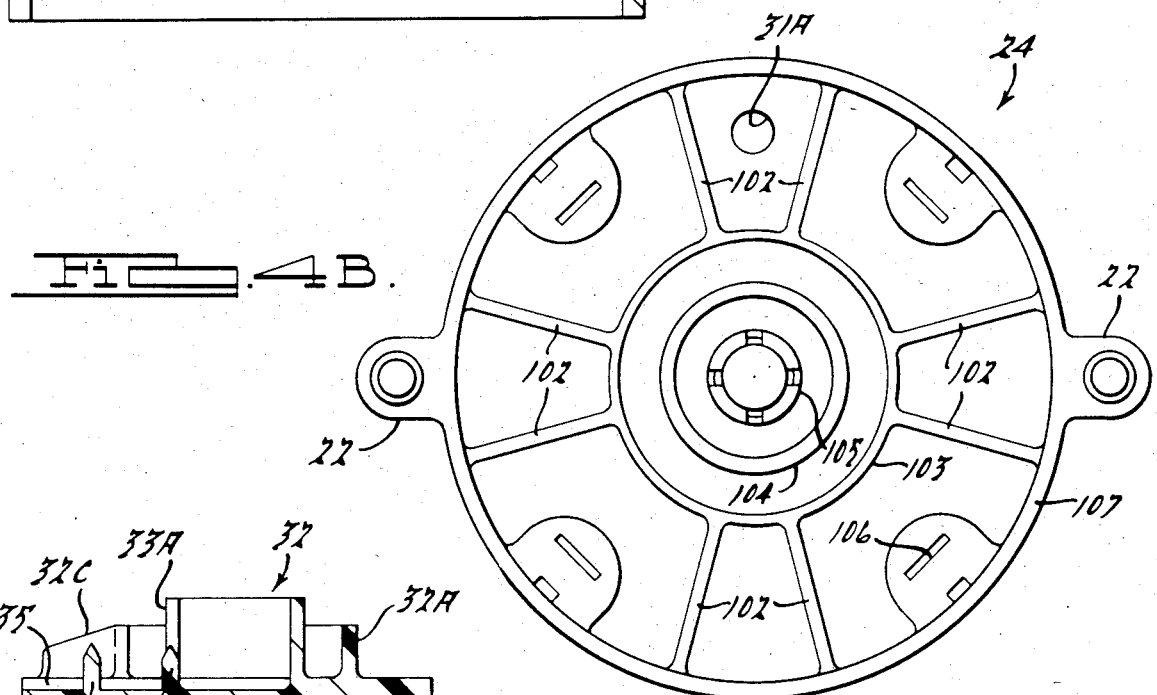
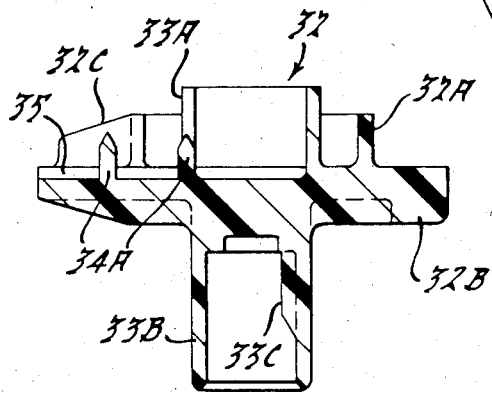
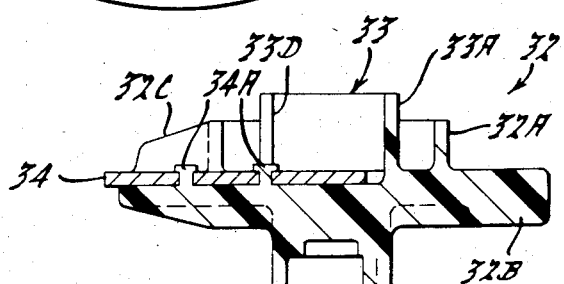
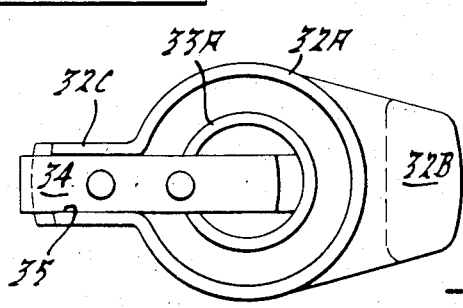

WINDOW-IN-VANE INTERRUPTER AND SWITCH PLATE ASSEMBLY FOR IGNITION DISTRIBUTOR

BACKGROUND AND SUMMARY OF THE INVENTION

This invention relates to a breakerless ignition distributor and system as may be used with internal combustion engines for automotive vehicles, for example.

The available space in an automotive engine compartment is very limited and the desire to reduce weight is high. These factors dictate that distributors be of compact size and employ lightweight components which require a minimum of adjustments and alignment while being able to withstand the shock and vibration in the engine compartment.

The subject invention advances the art of ignition distributors which work with electronic ignition systems, which, in most cases, are now computerized in motor vehicles, along with Hall Effect switches or electrical pick-ups and associated electrical and solid state electronic circuitry. Such a distributor illustrative of the prior art is illustrated in U.S. Pat. No. 4,165,726 to Helmer which is hereby incorporated by reference.

The ignition distributor employs features of an insertless distributor cap further described in U.S. Pat. No. 4,338,895 to Lennis and Handy, which is also hereby incorporated by reference.

In U.S. Pat. No. 2,918,913 to Guiot, attention is invited to FIG. 2A which illustrates metal disk 19 with apertures 20 which interact with oscillating coil 7. Attention is also invited to FIG. 4A showing metal disk 21 and aperture 22 interacting with coil 9.

U.S. Pat. No. 3,789,168 to Meyer et al. illustrates an ignition distributor device for use with vehicle engine ignition systems equipped with electronically advanced spark timing angle controllers.

U.S. Pat. No. 4,342,292 to House et al. illustrates an annular insulating rib 41 on a rotatable member 40.

U.S. Pat. No. 393,849 to Sae illustrates a variable ignition distributor which is designed to furnish a high voltage spark to one spark plug and a low voltage spark to another spark plug.

U.S. Pat. No. 4,464,142 to Bridges et al. discloses an ignition distributor and a shaft coupler.

U.S. Pat. No. 4,470,385 to Burk et al. illustrates another distributor for use with an internal combustion engine.

U.S. Pat. No. 4,485,796 to Boyer illustrates still another example of ignition distributors. Attention is invited to FIG. 6 and more specifically to metallic plate member 50 with radially extending slots 54 and 56.

U.S. Pat. No. 4,519,362 to Arakawa illustrates a signal rotor 111 with a cylinder discrimination signal producing magnet 116. This is best shown in FIG. 10A. Also illustrated in a slit disk type signal rotor 121 with a cylinder discrimination signal producing slit 126. This is best illustrated in FIG. 11A.

It is an object of the subject invention to minimize the size of the distributor.

It is a further object of the invention to reduce the size of the distributor by providing a window-in-vane on an interrupter assembly which reduces the number of vanes needed by one by eliminating a second interrupter assembly which carries the now eliminated vane.

It is another object of the subject invention to provide a switching technique to work with the subject window-in-vane and Hall Effect sensors in the ignition distributor.

It is another object of the subject invention to provide a distributor cap which works in communication with a rotor to provide a labyrinth structure to minimize the effects of arcing and to provide ribs to interfere with and lengthen the wet surface path along the inside of the distributor cap.

It is still a further object of the subject invention to provide a distributor cap and rotor which are designed to work together to create a pumping action when the rotor is in motion which urges the charged and ionized atmosphere inside the distributor cap upward and out of the cap through a vent tower.

It is still another object of the subject invention to provide an improved spark shield which helps to isolate the spark occurring between the rotor electrode and the distributor cap electrodes from the Hall Effect sensors which are concurrently in communication with the interrupter assembly.

Another object is to provide a switch plate assembly to carry two pairs of Hall Effect generators and sensors.

This application is one of six applications filed on the same date, all commonly assigned and having similar Specification and Drawings, the six applications being identified below:

| U.S. Serial Number | Title |
|---|---|
| TO BE DETERMINED | Window-In-Vane Interrupter And Switch Plate Assembly For An Ignition Distributor |
| TO BE DETERMINED | Labyrinth For An Ignition Distributor |
| TO BE DETERMINED | Cap And Rotor Assembly With Atmospheric Purging Action |
| TO BE DETERMINED | Wet Surface Tracking Resistance For An Ignition Distributor Cap |
| TO BE DETERMINED | Spark Shield And Inlet Air Vent For An Ignition Distributor |
| TO BE DETERMINED | Plastic Hub And Interrupter Assembly For An Ignition Distributor |
| TO BE DETERMINED | Ignition Distributor - Hall Effect Sensor Switching System And Method |

DESCRIPTION OF THE DRAWINGS

Other objects, features and advantages of the present invention will become more fully apparent from the following Detailed Description of the Preferred Embodiment, the appended Claims and in the accompanying drawings in which:

FIG. 1 is a perspective view of the subject ignition distributor showing where it connects to the various engine components;

FIG. 2 is an exploded perspective view of the main parts of the subject ignition distributor;

FIG. 4A is a sectional view of the distributor cap without the spark plug electrodes, but with the coil electrode in place;

FIG. 4B is an interior view of the distributor cap without the coil electrodes and spark plug electrodes;

FIG. 5A is a cut-away of the rotor illustrating the rotor staking nubs protruding from the rotor prior to being ultrasonically worked thereby trapping the rotor electrode to the rotor;

FIG. 5B is a sectional view of the rotor with the rotor electrode in place and showing the rotor staking nubs after being ultrasonically worked;

FIG. 5C is a plan view of the rotor with the rotor electrode;

DETAILED DESCRIPTION OF THE PREFERRED EMBODIMENT

Figure 3:
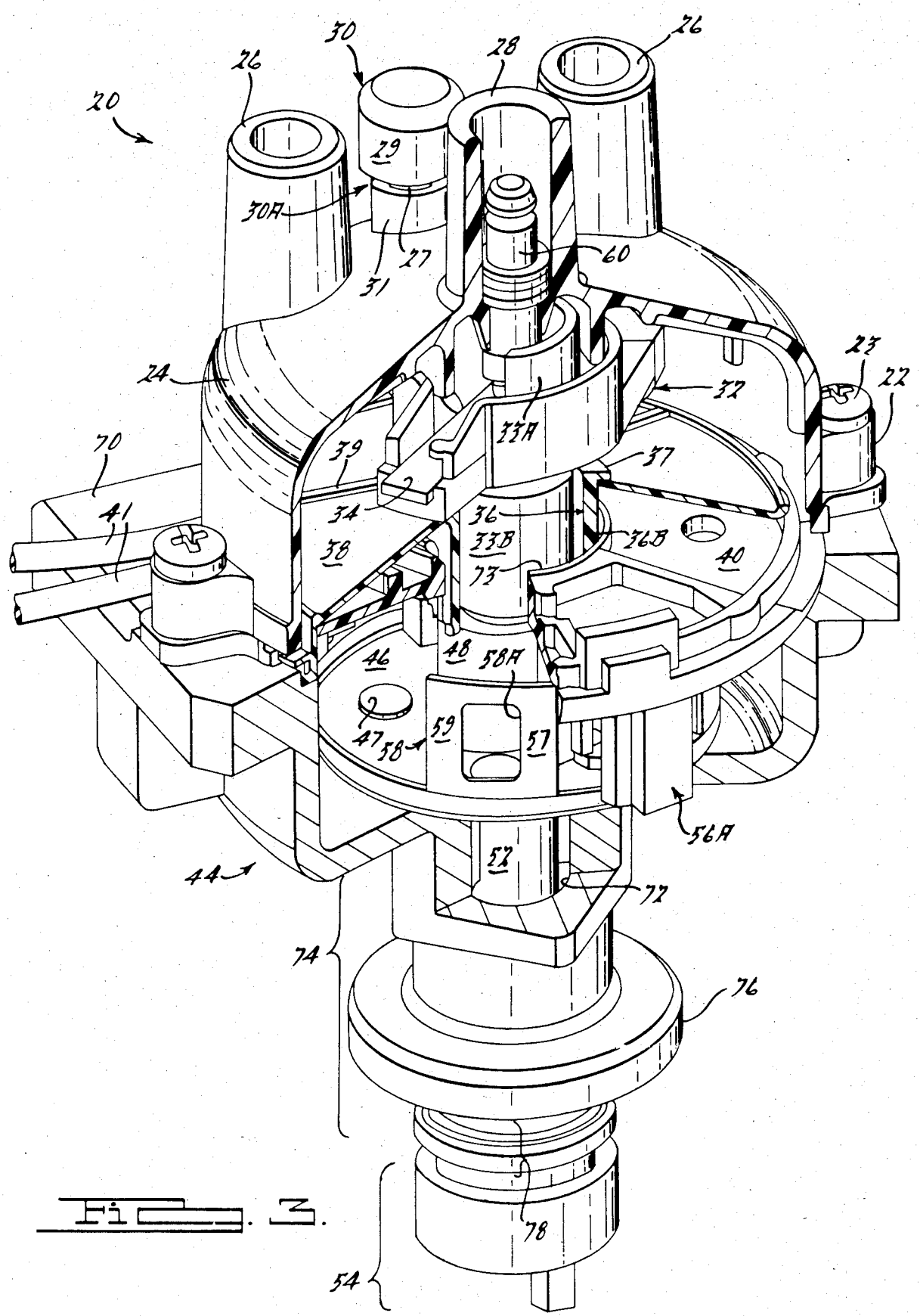
FIG. 3 is a cut-away perspective view of the subject ignition distributor illustrating the various parts.

Referring to FIG. 1, the ignition distributor 20 is shown in perspective. The distributor communicates with the coil 80 via a wire connected to coil tower 28 and running to coil 80. The coil 80 is then connected to the engine control computer 82 with the ability to store data, mathematical relationships, programs and methods and with the ability to receive data from sensors, make computations using data and the stored relationships, programs and methods, and to translate the results of those computations to control signals for the sensors and transducers which control the operation of an internal combustion engine 100. The computer 82 is also able to act as timer and counter for various purposes. The transducers controlled include the coil 80, distributor 20 and fuel injectors grouped in two banks 86 and 88.

The ignition distributor 20 also communicates with spark plugs 84 which are in communication with the internal combustion chambers of engine 100.

The ignition distributor 20 is mounted and grounded to the engine 100 via drive coupling 54, seal 78, and fastened to the engine 100 by way of a clamp (not shown) in communication with mounting flange 76.

The ignition distributor 20 is in communication with the engine control computer 82 via wires 41 and connectors 42. The engine control computer 82 gets its power from the vehicle battery and power supply system both schematically shown as 83.

Referring now to FIG. 2 which is an exploded perspective view of the subject ignition distributor 20, several main parts are shown: distributor cap 24, rotor 32, spark shield 38, switch plate assembly 40, housing 44, interrupter 46, metal shutter or vanes 50, drive shaft 52, and stem portion 74, along with drive coupling 54.

Referring now to the distributor cap 24, the spark towers 26 house spark plug electrodes (shown in the Lennis, Handy patent) which are connected to spark plug wires which in turn communicate with the spark plugs 84 of the engine 100. (For simplicity, only one of the spark plug connections is shown in FIG. 1.) The spark plug electrodes communicate with the rotor 32 via rotor electrode 34 as the rotor moves about a shaft 52 passing the rotor electrode 34 near to the spark plug electrodes.

Also shown on the distributor cap 24 is bored coil tower 28 which houses the coil electrode 60 and its associated parts (shown in FIG. 3 and FIG. 4A) for communication with the rotor 32 and coil 80.

The distributor cap 24 is generally of a dome shape and is designed to mate with the bowl shaped housing 44 thereby entrapping intervening parts, such as the rotor 32, spark shield 38, switch plate assembly 40 and interrupter 46, along with shaft 52. Provided with the distributor cap 24 to allow tight communication with the intervening parts previously listed and the housing 44 are flanges 22 which contain holes (not visible) for mounting screws 23. The screws 23 communicate with the switch plate assembly 40 through flanges 43 appended from the switch plate assembly 40. Through the flanges 43 are holes 43A designed to accept screws 23. The screws then are driven into the bowl shaped housing 44 into threaded holes 45. Another tower on the dome shaped distributor cap 24 is vent tower 30. The vent tower 30 provides a port 31A through which the atmosphere inside the ignition distributor 20 can be vented.

The rotor 32 carries a rotor electrode 34 for communication with the spark plug electrodes (not shown) affixed to the spark towers 26. The type of electrodes employed are similar to those illustrated in U.S. Pat. No. 4,338,895 to Lennis and Handy and the construction of the spark towers 26 is likewise similar. This structure is adequately described in the Lennis and Handy patent which is incorporated by reference. Also incorporated by reference is the U.S. Pat. No. 4,165,726 to Helmer.

The rotor 32 has a cylindrical shaped member 33, the top portion of which accepts the rotor electrode 34 via slot 35. The cylindrical shaped member 33 is open at both ends, the top opening 33A being provided for communication between the coil electrode 60 and its associated parts, shown in FIG. 3 and FIG. 4A, and the rotor electrode 34. The bottom opening 33B of the cylindrical shaped member 33 allows communication with shaft 52. The shaft 52 has notch 53 to mate with a key 33C (shown in FIG. 5A) contained inside the bottom opening 33B of cylindrical shaped member 33 to provide tight communication between rotor 32 and shaft 52. The cylindrical shaped member 33 will be further described in conjunction with FIG. 5A, FIG. 5B and FIG. 5C.

Spark shield 38 is affixed to switch plate assembly 40 by means of a retainer 36. The spark shield 38 covers Hall Effect generator and sensor units 55, 55A, 56 and 56A shown in FIG. 3 and shields them from spark. This will be further explained in conjunction with FIG. 6A and FIG. 6B.

There are two sets of Hall Effect generators (55 and 56) and sensor circuits (55A and 56A), only one of which is shown in the cut-away perspective of FIG. 3. Each Hall Effect sensor circuits 55A and 56A is connected to the engine control computer 82 by means of wires 41 and connectors 42.

The bowl shaped housing 44 is designed to accept the interrupter 46 inside the bowl. The bowl shaped lower housing has an opening 72 shown in FIG. 3 to accept the shaft 52. The shaft 52 is in communication with the interrupter 46 by means of a plastic hub 48. The interrupter 46 is ultrasonically staked to the hub 48. This ultrasonic staking operation is also employed to connect the rotor electrode 34 to the rotor 32.

The interrupter 46 is provided with a vane or metal shutter 50 for each cylinder contained in the engine 100. The particular embodiment shown is for a four cylinder engine and four vanes are provided.

One of the vanes in the interrupter 46 contains a window and is called a windowed shutter or window-in-vane 58, this is shown in cut-away perspective in FIG. 3.

The bottom portion of the bowl shaped housing 44 is stem 74. This portion is designed to communicate with the engine 100 and mount the ignition distributor 20 firmly thereto. Affixed to the end of the stem portion 74 which is designed to communicate with the engine 100 is drive coupling 54. The purpose of the drive coupling 54 is to communicate with the engine's crankshaft, silencer shaft or equivalent. This drive coupling will move in accordance with the engine's crankshaft or silencer shaft etc. (a design choice) and rotate the shaft 52 and thereby the interrupter 46 and connected rotor 32.

The end of the ignition distributor 20 which communicates with the engine 100 for mounting purposes involves the end to which drive coupling 54 is affixed. The drive coupling end is inserted into a hole provided in the engine 100 communicating with the appropriate shaft inside the engine 100. The stem portion 74 is further inserted into the engine 100 and a seal is provided between the two and is shown as seal 78.

Mounting flange 76 is provided on stem portion 74 to communicate with a clamp (not shown) to firmly affix the ignition distributor 20 in place and help to retain its position in the engine compartment of an automobile in which the engine 100 is mounted.

Referring to FIG. 3, illustrated is a cut-away perspective of the ignition distributor 20. The ignition distributor 20 is shown in full assembly with all of the intervening parts.

The generally dome shaped distributor cap 24 has spark towers 26 and a center bored coil tower 28, along with a vent tower 30.

Vent tower 30 is made up of a vent stem 31 and a vent cap 29. The vent stem 31 is provided with a port 31A (shown in FIG. 4B) through to the inside of distributor cap 24.

The vent cap 29 is affixed to the vent stem 31 onto a concentric stem 27 which is smaller in diameter than stem 31. The hole through stem 31 communicates with the atmosphere outside of distributor cap 24 via gap 30A. In other words, vent cap 29 does not seal off the hole in stem 31 and concentric stem 27, but merely shields it and still allows communication between the inside of ignition distributor cap 24 and the atmosphere outside of cap 24 via port 31A through stem 31, concentric stem 27, cap 29 to gap 38.

The center electrode for connection to the coil from the ignition distributor 20 is shown as electrode 60. Electrode 60 is placed inside bored coil tower 28 and is spring loaded. The spring loading is in its relaxed state with the cap in an unassembled condition with the rest of the intervening parts. Therefore, when the rotor 32 communicates tightly with the rest of the assembly and distributor cap 24, a portion of the center electrode 60 is urged toward the top of tower 28 and the spring 61 (shown in FIG. 4A) is in its compressed position thereby urging continuous contact with rotor electrode 34 which is ultrasonically staked to rotor 32. This is further explained in conjunction with FIG. 4A.

The distributor cap 24 is affixed to the bowl shaped housing 44 by means of flanges 22 and screws 23 which are tightened into threaded holes 45 on the flanged platform section 70 of bowl shaped housing 44.

Also shown in FIG. 3 is the interaction between the rotor 32, the cylindrical member 33 and the rest of the intervening parts.

It can be seen that the rotor 32 and distributor cap 24 also form a labyrinth structure to prevent transmittal of the spark entering the ignition distributor 20 at coil electrode 60 from traveling anywhere but to rotor electrode 34.

Entrapping the spark shield 38 to the switch plate assembly 40 is retainer 36. Retainer 36 is composed of a segmented annular ring 37 shown in more detail in FIGS. 8A and 8B and two tabs 36A fixed to legs 36B.

The spark shield 38 is a dome shaped structure with stiffening ribs 39. It is of the same approximate diameter as the switch plate assembly 40 and is designed to interlock with it at pockets 90 around the circumference shown in FIG. 7A and FIG. 7B. The center of the dome shaped spark shield 38 is a circular opening 73 designed to match up with the similar circular opening 73A and switch plate assembly 40.

The retainer 36 is inserted through opening 73 through dome shaped spark shield 38 until the legs 36B force the connected tabs 36A through the switch plate assembly 40. At this point, the tabs 36A protrude over the center opening 73A of the switch plate assembly 40 until tabs 36A lock it in place. The retainer 36 thusly holds spark shield 38 to switch assembly 40.

Switch plate assembly 40 holds two Hall Effect generators 55 and 56 and sensor circuits 55A and 56A (only one of which is shown in FIG. 3). The switch plate assembly 40 provides mounting brackets 63 and slots 62 for the generators 55 and 56 and back plates 64 for sensor circuits 55A and 56A by which the Hall Effect signal is received. There is a gap 66 between the Hall Effect generators 55 and 56 as mounted in brackets 63 and the back plate 64 such that the interrupter's metal shutters or vanes 50 and 58 can pass through the gap 66 as they rotate with interrupter 46. The Hall Effect sensor circuits 55A and 56A sense the presence or absence of the metal vanes 50, along with the presence or absence of window-in-vane 58 and its parts, right window-in-vane member 57, window 58A, and left window-in-vane member 59. The switch plate assembly 40 is shown in greater detail in FIG. 7A and FIG. 7B and its corresponding description.

The window-in-vane 58 likewise will pass through this gap. The presence or absence of a metal vane 50 or a portion of window-in-vane 58 will cause a difference in the signal received by one of the Hall Sensors 55A and 56A. In other words, the presence of window-in-vane 58 causes a difference in the output signal from the Hall sensor circuits or pick-ups 55A snd 56A as the portions of window-in-vane 58 pass near the sensor circuits 55A and 56A. In other words, as right window-in-vane member 57, window 58A and/or left window-in-vane member 59, all parts of window-in-vane 58, interrupt the Hall Effect signal, a magnetic field, generated by Hall Effect generators (magnets) 55 or 56, a different output from sensor circuits 55A or 56A is produced than that by the interruption of the same Hall signal by a non-windowed vane.

The interrupter 46 is ultrasonically staked at points such as 47 to a plastic hub 48 which has a bottom flange 48A onto which the interrupter 46 is placed. See FIG. 10A, FIG. 10B and FIG. 10C. There are holes 46A in the interrupter 46 through which hubs 47 are placed and protrude through the interrupter 46. The ultrasonic staking operation melts material like nubs 47 such that the interrupter 46 is staked to the plastic hub 48. The plastic hub 48 also has a cylindrical portion 48B which has an opening therethrough to communicate with shaft 52 and the other concentrically mounted intervening parts to the ignition distributor 20. This is further illustrated in FIG. 10, FIG. 10A and FIG. 10B and the corresponding description.

The lower stem portion 74, the bowl shaped housing 44 comprises an opening to communicate with shaft 52. It is through shaft 52 that the action of the driving coupling 54 is communicated to the rest of the ignition distributor parts to help produce the desired signal and spark distribution patterns. The opening is designated as 72.

The stem portions 74 further comprises a mounting flange 76 which will accept a mounting clamp (not shown) to firmly affix the ignition distributor 20 to the engine 100.

A seal 78 is provided at the end of stem portion 74 to seal the action and operation of the drive coupling 54 from the outside atmosphere.

Drive coupling 54 communicates with the interior of the engine 100 by interacting with the crankshaft or silencer shaft (or equivalent) to produce a rotating motion which thereby engages the shaft 52 and generates the rotating motion inside the distributor 20.

Referring to FIG. 4A, the distributor cap 24 is shown in a sectional view with coil electrode 60 in place. Also shown is the spring 61 and carbon contact rod 60A which provides a spring loading action which urges electrical contact between coil electrode 60 by way of carbon contact rod 60A contacting rotor electrode 34.

The coil electrode 60 and accompanying spring loaded parts are placed in bored coil tower 28. Spark plug electrodes (not shown) are placed in spark tower 26. The spark plug electrodes protrude into the interior of distributor cap 24 through slots 106 for eventual communication with the rotor electrode 34 as it rotates about the center axis of the distributor 20 via shaft 52.

Also illustrated in FIG. 4A are wet surface interruption ribs 102 which follow the shape of the generally domed distributor cap 24 in a radial fashion. The purpose of these ribs is to interfere with the spark path should it attempt to flow other than between the rotor electrode 34 and one of the spark plug electrodes in tower 26. This condition could occur if the inside surface 25 of the distributor cap 24 becomes contaminated with moisture and/or dirt. This contamination could attract the spark to take a path along the inside surface 25 of the distributor cap 24. When this occurs, the ribs 102 will provide sharp obstructions to the spark, forcing it to divert from the path along the inside surface 25 to the more resistant path of traveling in air. Another feature provided by the ribs 102 is to increase the inside surface area 25 by lengthening the path that a spark would have to travel thereby increasing the resistance of the path.

Another rib with a similar function to ribs 102 is rib ring 103. The purpose of this ring is to further isolate the high tension electrical energy created at the juncture of electrode 60 via carbon contact rod 60A and rotor electrode 34. Rib ring 103 provides a fence around the combination of the coil electrode 60 (and its associated parts) and rotor 32.

Another spark isolation feature in the ignition distributor cap 24 is a labyrinth structure defined by outer labyrinth 104, inner labyrinth 105 in conjunction with portions of rotor 32, namely, cylindrical shaped member 33 and rotor ring 32A shown in FIG. 5A, FIG. 5B and FIG. 5C. This labyrinth structure, along with the ribs 102 and rib ring 103, provide a great amount of spark isolation on the inside surface 25 of distributor cap 24.

Referring to FIG. 4B, an inside view of the distributor cap 24 is shown, further illustrating the concentric relationship between inner labyrinth 105, outer labyrinth 104, and rib ring 103. The ribs 102 depend from the rib ring 103 in a radially outward direction toward the outside edge 107 of distributor cap 24. Also provided in the distributor cap 24 are spark plug electrode slots 106 and vent port 31A.

The combined radial/concentric rib design of items 102 and 103 provide increased wet surface tracking resistance with minimal extra manufacturing material.

Referring now to FIG. 5A, FIG. 5B and FIG. 5C, the rotor 32 is illustrated.

In FIG. 5A a sectional view of rotor 32 illustrates the rotor staking nubs 34A on platform 32B. The nubs 34A are shown in an unworked condition prior to the assembly with rotor electrode 34 and prior to an ultrasonic staking or welding operation which will melt a portion of rotor staking nubs 34A until rotor electrode 34 is affixed to rotor 32.

Rotor staking nubs 34A are shown in FIG. 5B after assembly to rotor electrode 34 and after ultrasonic staking or welding.

FIG. 5B and FIG. 5C further illustrate the other portions of the rotor 32. FIG. 5B shows rotor 32 in a sectional view depicting the cylindrical shaped member 33 in an upper portion 33A and a lower portion 33B. The cylindrical shaped member 33 is interrupted by the rotor platform 32B which supports the rotor electrode. The upper portion 33A of the cylindrical shaped member 33 has a bore 33D which allows communication between coil electrode 60 (and its associated parts) and rotor electrode 34. The lower portion 33B of cylindrical shaped member 33 is also provided with a bore 33E which allows communication between rotor 32 and shaft 52. The rotor 32 is locked in position with the shaft by means of a key 33C formed on the interior surface 33B to interrupt the bore 33E. The key 33C is in tight communication with notch 53 on shaft 52 when the rotor 32 is inserted onto the shft 52.

Also provided on platform 32B is rotor ring 32A which encircles upper portion 33A or cylindrical shaped member 33. The rotor ring 32A, as well as the upper portion 33A of cylindrical shaped member 33, is interrupted by slot 35 to allow for the insertion and affixation of rotor electrode 34 onto the platform 32B in such a way as to allow the rotor electrode 34 to communicate with the coil electrode 60 (and its associated parts) and the spark electrodes (not shown).

The concentric ring rotor/cap labyrinth achieves center-to-outer cap random fire resistance. The high rotor side walls formed by 33A, in conjunction with the labyrinth rings 104 and 105, achieve cylinder-to-cylinder misfire resistance.

The slot 35 is flanked by pumping surface 32C which follows the shape of the inside top of the distributor cap 24. The purpose for this mating shape is to create a pumping action between the pumping surface 32C and the inside top of the distributor cap 24. This action results in the urging of the inside atmosphere of distributor cap 24 upward and eventually out of the vent port 31A in vent stem 31 exiting the vent tower 30 via the gap 30A provided between the vent tower 30 and vent cap 29. This pumping and vent action helps reduce the possibility of component deterioration due to the presence of high tension electrical energy and the possible corrosive action of the presence of spark.

The pumping surface 32C, in conjunction with the upper portion 33A of cylindrical member 33, forms a rotor side wall which is tapered to the shape of the interior of cap 24 to enhance the pumping action and to also provide crossfire protection.

The extra deep barrier ring in cap 24 formed by outer labyrinth 104 and inner labyrinth 105 complements the rotor side walls and rings formed by the upper portion 33A of cylindrical member 33 along with rotor ring 32 for a labyrinth arc over protection which is relatively insensitive to any end play of shaft 52 and to any component tolerances.

Figure 6A:
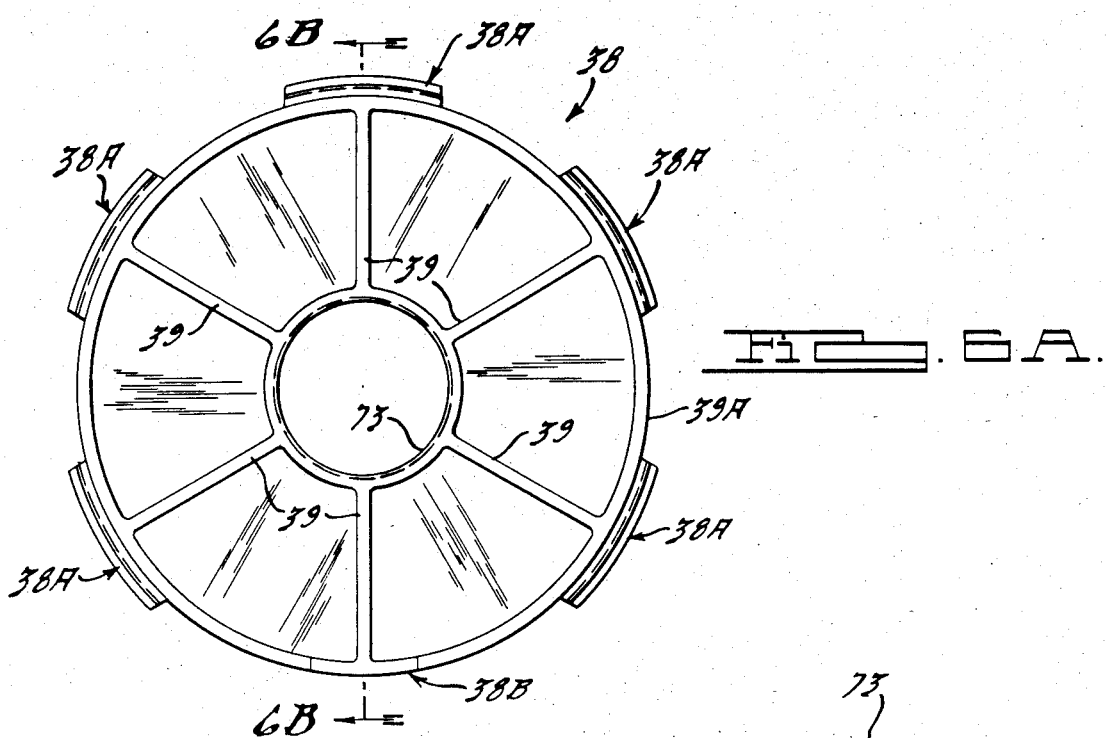
FIG. 6A is a plan view of the spark shield.
Figure 6B:
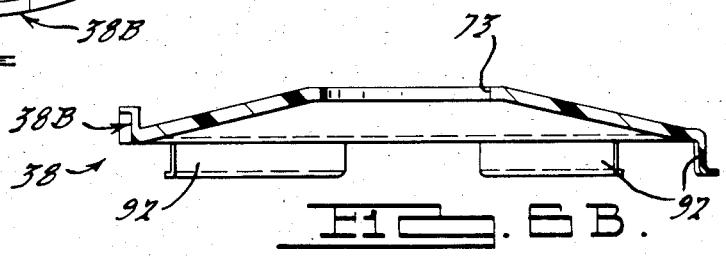
FIG. 6B is a sectional view of the spark shield.

Referring now to FIG. 6A and FIG. 6B, the spark shield 38 is displayed in a plan view in FIG. 6A and in a sectional view in FIG. 6B. The spark shield is of generally dome shape shown in FIG. 6B and is provided with an opening 73 at its center. Stiffening ribs 39 are provided in a radially outward direction from the opening 73 toward the outer edge 39A. The diameter of the spark shield 38 is generally that of the switch plate assembly 40 and is provided on the outer edge 39A with mating means 38A at various positions around the outer edge 39A to mate with the switch plate assembly 40. The outer edge 39A is also provided with index means 38B to properly orient the spark shield 38 and mating means 38A onto the switch plate assembly 40. The mating means 38A takes the form of legs shown as 92 in FIG. 6B projecting perpendicularly down from the circumferential edge of the spark shield 38.

The spark shield 38 protects the switch plate assembly 40 from high voltage discharges. The thin membrane design compresses easily under the compression load from snap retainer 36 for a tight fit. The radial ribs 39 allow full molding fill with minimal material.

The spark shield 38 isolates the switch plate assembly 40 and other parts in bowl shaped housing 44 from ozone and related compounds present in the atmosphere inside the distributor 20 surrounding the electrodes.

The spark shield 38 also isolates the cap 24 from oil vapor from engine 100.

The spark shield 38 also improves ventilation and purging of the atmosphere inside cap 24 by limiting the cross-sectional sweep area of rotor 32.

Figure 7A:
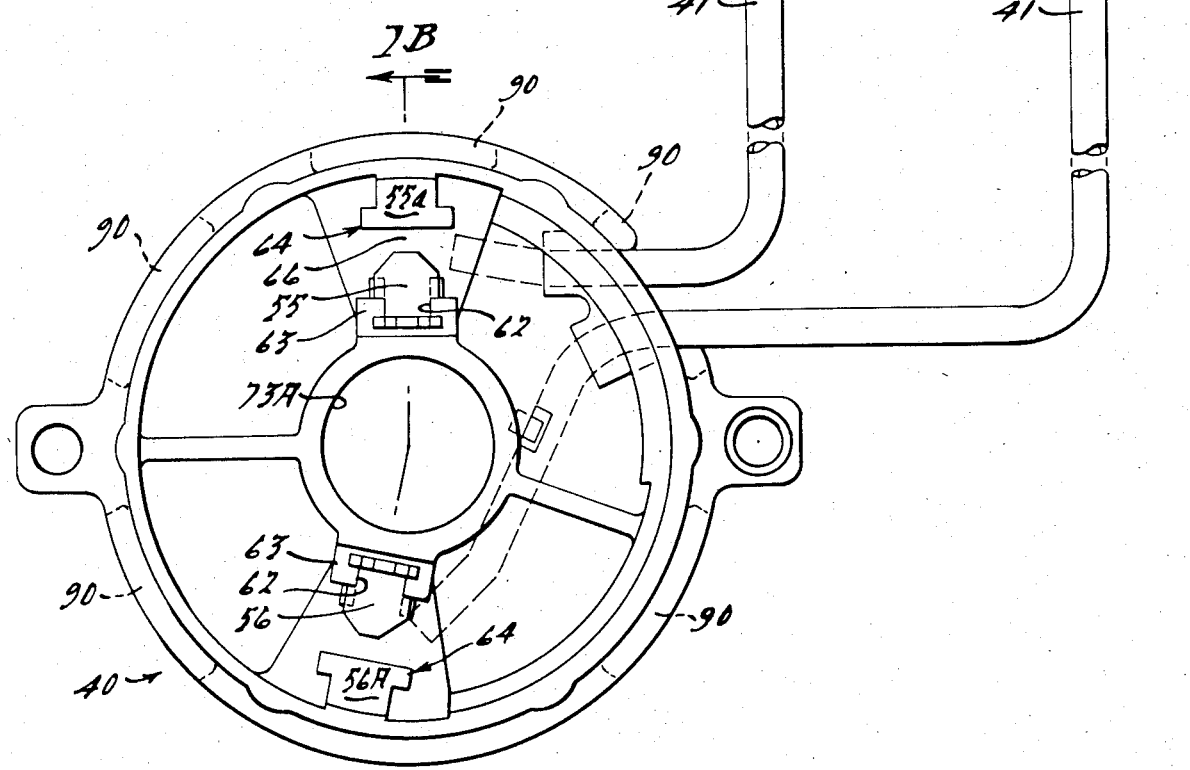
FIG. 7A is a plan view of the switch plate assembly.
Figure 7B:
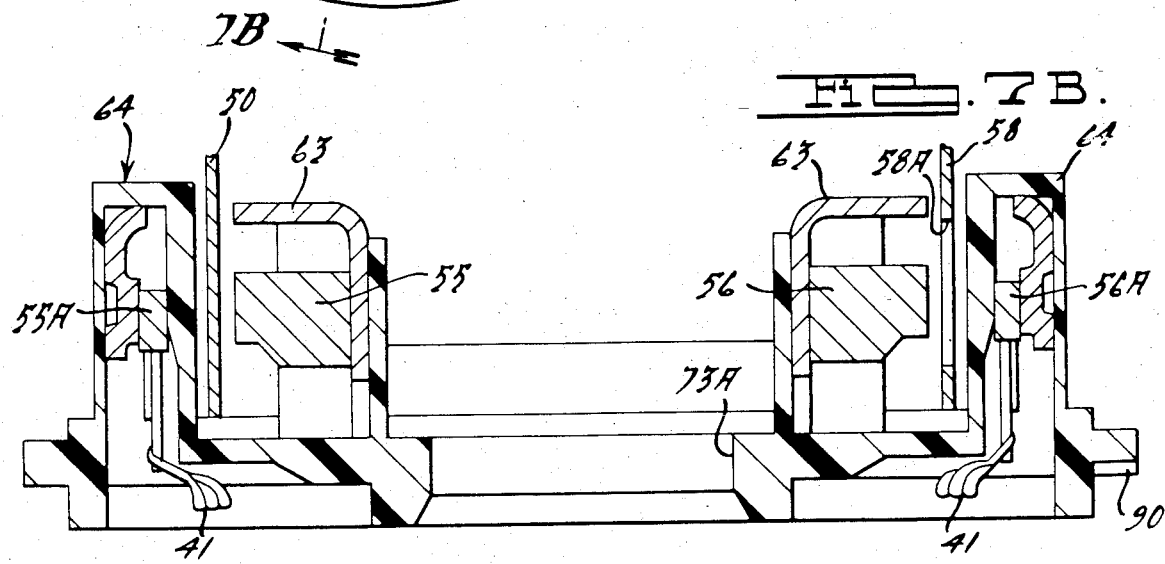
FIG. 7B is a sectional view of the switch plate assembly.

Referring to FIG. 7A and FIG. 7B, the switch plate assembly 40 is illustrated. The switch plate assembly 40 is generally of cylindrical shape to match that of the distributor cap 24. The switch plate 40 is provided with an opening 73A to match the opening 73 in the spark shield 38. The most important portions provided on the switch plate assembly are the mounting brackets 63 and slots 62 which are designed to mate with the Hall Effect generators 55 and 56 in such a fashion as to allow the generators 55 and 56 to transmit their signals to a Hall Effect sensor circuits 55A and 56A mounted in backplates 64. Space is provided by gap 66 between generators 55 and 56 and backplate 64 to allow the metal shutters or vanes 50 and 58 on interrupter 46 to pass between the generators 55 and 56 and backplates 64 as they rotate about the central axis of the distributor 20.

The generators 55 and 56 are mounted on one side of the switch plate assembly 40. The wires 41 pass from the sensor circuits 55A and 56A and are routed along the bottom of the switch plate assembly 40 for eventual termination in connectors 42.

The mounting slots 62 are provided in mounting brackets 63. The brackets 63 are appended from the edge along the circular openings 73A. The reason for the symmetrical offset location between the Hall Effect generators 55 and 56 and the Hall Effect sensors 55A and 56A and their brackets 63 and backplates 64 is due to the timing requirements of the control methods and speed of the engine 100 and the speed of the engine control computer 82, along with the performance of the Hall Effect generators 55 and 56, along with the sensors 55A and 56A. Each sensor 55A and 56A contains an integrated circuit which interacts with the presence (or lack of presence) of the signal from generators 55A and 56A. The integrated circuit operates as a switch in response to the signals. The integrated circuit is activated by the presence of a range of signals from the generators 55 and 56. This range is expanded or contracted based on temperature's effect on the generators 55 and 56 and the sensors 55A and 56A. These conditions all affected the placement of the Hall Effect generators and sensors in their offset location.

FIG. 7B is a sectional view of the switch plate assembly 40 illustrating the interaction between the metal shutters or vanes 50 and 58 of the interrupter 46 with the Hall Effect generators 55 and 56 and sensor circuits 55A and 56A. The generators 55 and 56 are essentially a magnet and the sensor circuits 55A and 56A are pick-up circuits which react to the presence or lack of a magnetic field from generator/magnets 55 and 56. The reaction sensed in 55A and 56A causes a voltage output to be read from wires 41. It is this output which is processed by the engine control computer 82.

The legs 92 on spark shield 38 mate with and sit in pockets 90 on the switch plate assembly 40. The pockets 90 are located on the outer circumferential edge of switch plate assembly 40.

When assembled, legs 92 and pockets 90 form an inlet 94 shown on FIG. 1. The inlet allows outside air to be urged into the interior of distributor cap 24 by the pumping action of rotor 32. This augments the flow of air through the cap 24 as the main source of air is inlet 94 and it is not restricted by the internal components of the ignition distributor 20.

Figure 8A:
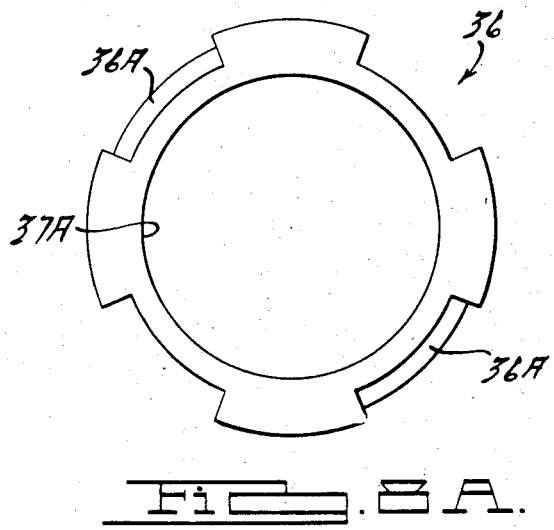
FIG. 8A is a plan view of the retainer.
Figure 8B:
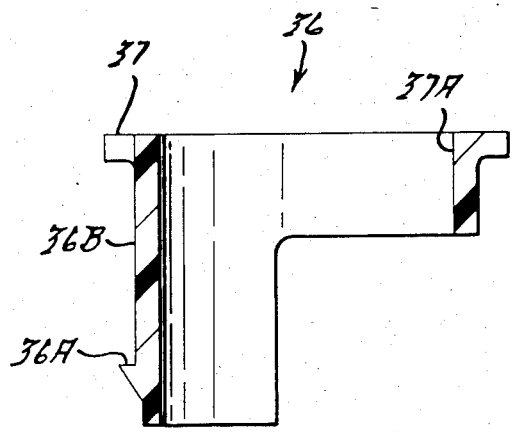
FIG. 8B is a sectional view of the retainer.

Referring now to FIG. 8A and FIG. 8B, the retainer 36 is illustrated in plan and sectional views respectively.

In FIG. 8A the retainer 36 is shown in plan view depicting the retainer 36 as a generally circular shape. FIG. 8B further illustrates the retainer 36 as having the general shape of a cylinder. The retainer 36 is provided with an opening 37A which is surrounded by a segmented annular ring 37. The purpose of the annular ring is to interlock with the bottom of switch plate assembly 40.

Retainer 36 is also provided with tabs 36A which protrude out from the edge of legs 36B. Retainer 36 has two legs 36B both fitted with tabs 36A. The purpose for these legs and tabs is to fit through the openings 73 in spark shield 38 and opening 73A in switch plate assembly 40. The tabs 36A, when the retainer 36 is fully inserted into the opening 73 and hole 73A, lock the top of the spark shield 38 in place with the switch assembly 40.

Figure 9A:
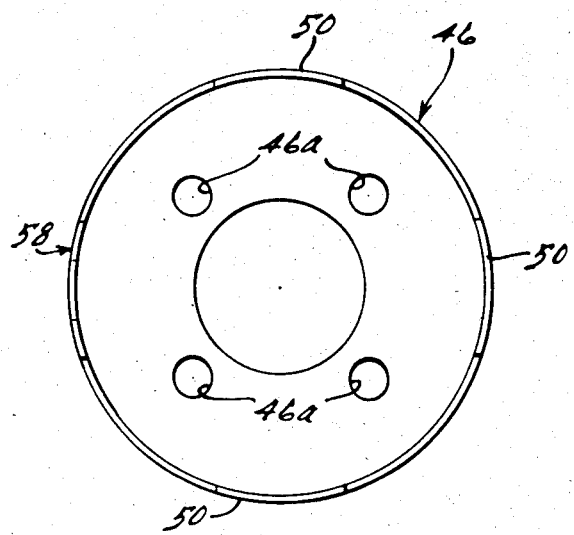
FIG. 9A is a plan view of the interrupter.

Referring to FIG. 9A, the interrupter 46 is shown in plan view. The interrupter 46 is of generally circular shape in this view and is provided with metal shutters or vanes 50 which are equal in number to the number of cylinders provided in engine 100 with the exception being that one of the metal shutters or vanes 50 is windowed and is designated as window-in-vane 58. The metal shutters or vanes 50 are illustrated in the side view shown in FIG. 9B.

Figure 9B:
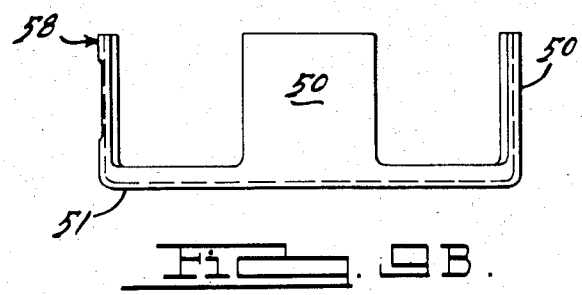
FIG. 9B is a side view of the interrupter.

As is evident from the side view of FIG. 9B, the interrupter 46 takes on a cylindrical bowl shape as formed by the metal shutters or vanes 50 along with window-in-vane 58 which depend from the circular shape base 51 along its outer edge perpendicular to the surface of 51. The interrupter is provided with holes 46A which are designed to accept staking nubs 47 from the hub 48.

Figure 9C:
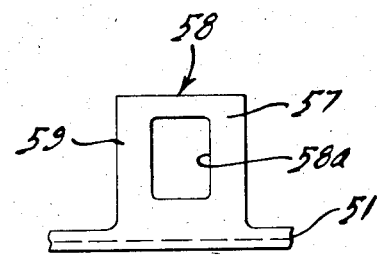
FIG. 9C is a cut-away view of the interrupter showing the window-in-vane.

FIG. 9C illustrates window-in-vane 58 in a side view. The window-in-vane 58, like the other metal vanes 50, is formed from the circular shaped base 51 to the interrupter 46. The window 58A defines a right window-in-vane member 57 and a left window-in-vane member 59.

Figure 10A:
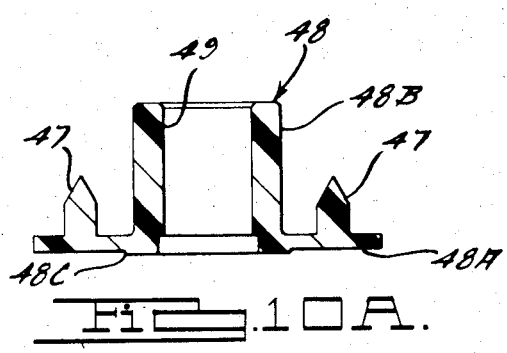
FIG. 10A is a cut-away of the hub illustrating the hub staking nubs protruding from the rotor prior to being ultrasonically worked thereby trapping the interrupter to the hub.

Referring to FIG. 10A, plastic hub 48 illustrated in a side sectional view showing the hub staking nubs 47 prior to being ultrasonically staked or welded after assembly through the holes 46A in interrupter 46. The hub 48 comprises a bottom flange 48A and a cylindrical portion 48B. The cylindrical portion 48B is affixed to the circular shaped bottom flange 48A and is central to the hub 48. The hub 48 is provided with an opening 49 to communicate with shaft 52.

Figure 10B:
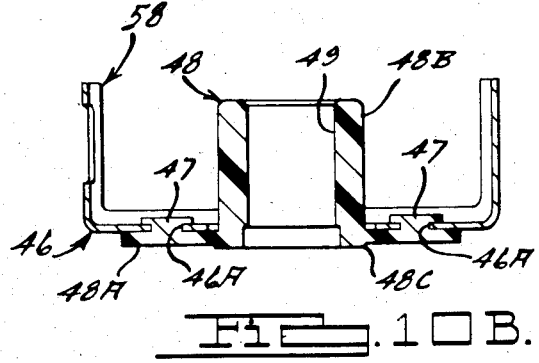
FIG. 10B is a sectional view of the hub with the interrupter in place and showing the hub staking nubs after being ultrasonically worked.

Referring to FIG. 10B, the hub 48 is shown after assembly to interrupter 46 and after ultrasonic staking or welding done to hub staking nubs 47. The interrupter 46 has been inserted over the hub staking nubs 47 through holes 46A in interrupter assembly 46, the ultrasonic staking operation welding the hub 48 to the interrupter 46. Also illustrated are metal vanes 50 and window-in-vane 58.

Figure 10C:
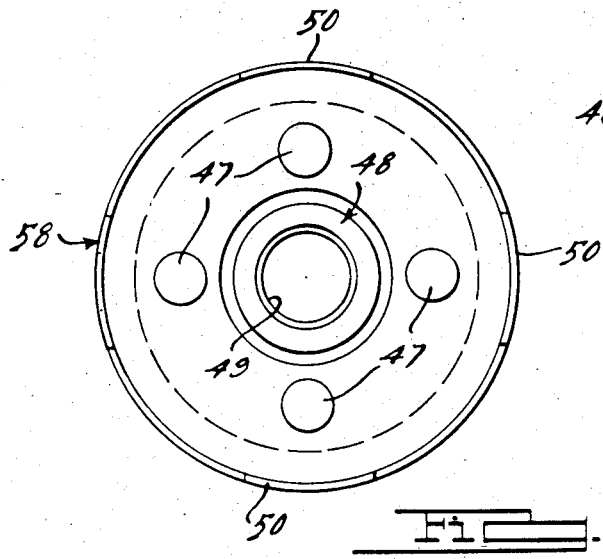
FIG. 10C is a plan view of the interrupter and hub, assembled.

Referring to FIG. 10C, a plan view is shown of the interrupter 46 assembled to the hub 48. The hub staking nubs 47 have been ultrasonically staked or welded and the vanes 50 and window-in-vane 58 are shown.

The hub 48 is made of a thermoplastic polyester material. It is drilled with and mechanically pinned to the shaft 52. Although this type of assembly has been used before, new to this embodiment is the running of the hub 48 along with the affixed interrupter 46 directly on a predominantly iron-composite bearing surface (not shown) provided in bowl shaped housing 44. Previously, the thermoplastic polyester hub material was separated from the bearing surface by a hardened steel washer to protect the hub 48 from rapid wear. With this design the function of the washer is integrated into the hub 48 with land 48C.

The use of the thermoplastic polyester material as a thrust mechanism in this application is considered revolutionary and has not been seen before.

The experience gained from the use of the thermoplastic polyester hub with a hardened steel washer in previous designs and laboratory testing have proven that the thermoplastic polyester hardened steel hub will operate successfully without the hardened steel washer.

The ignition distributor 20 is designed to work best with multi-point injection (MPI) fuel supply systems. However, with the deletion of one pair of the Hall Effect generators and sensors, and the replacement of the window-in-vane 58 with a solid metal vane 50, the distributor 20 can be used with a single point injection fuel supply system.

While the present invention has been disclosed in connection with the preferred embodiment thereof, it should be understood that there may be other embodiments which fall within the spirit and scope of the invention and that the invention is susceptible to modification, variation and change without departing from the proper scope and fair meaning of the following claims.

We claim:

1. An ignition distributor to work with an engine control computer, a coil, fuel injectors and the spark plugs of an internal combustion engine to supply high tension electrical energy to the spark plugs and to supply signals to the fuel injectors, the distributor comprising:

a distributor cap of a generally domed shape, the cap having spark towers to house electrodes for communication with the spark plugs of the internal combustion engine via wires, the cap also having a center coil tower to house a coil electrode for communication between the distributor and the coil of the internal combustion engine via a wire, the cap further housing other components within the distributor;

a bowl shaped lower housing to mate with the distributor cap;

drive coupling means connected to the lower housing for communication with the internal combustion engine such that rotational motion inside the engine results in proportional motion of the drive means;

a shaft connected to the drive means, the shaft being mounted on the interior of the distributor to rotate about the central interior axis of the distributor;

a rotor mounted onto the shaft and in tight communication with it so as to rotate with the motion of the shaft;

the rotor further having an electrode for communication with the spark plug electrodes mounted in the spark tower as the rotor moves about the shaft;

an interrupter comprising a circular flange and mounted concentrically about the shaft and affixed to it such that motion of the shaft results in motion of the interrupter;

the interrupter further comprising metal vanes equal in number to the number of internal combustion chambers in the internal combustion engine;

a switch plate assembly comprising a generally circular structure concentrically mounted around the shaft of the distributor allowing the rotor, shaft and interrupter to rotate freely through its center;

the switch plate assembly further comprising two pairs of signal generators and sensors being fixed on the switch plate assembly;

the signal generators and sensors being positioned to leave a gap between each generator and its corresponding sensor to allow the rotating metal vanes on the interrupter to pass between;

the pairs of signal generators and sensors being positioned on the switch plate assembly perpendicular to its generally circular shape such that the generators and sensors protrude toward the plane of the flange of the interrupter and are spaced to allow the metal vanes on the interrupter to pass between each pair of signal generators and signal sensors as the vanes rotate with the interrupter, shaft and rotor;

the interrupter with at least one of the metal vanes having a window for providing a distinctive interruption to the signals generated thereby causing a unique signal to be received by the sensors indicative of the vane with a window.

2. The ignition distributor of claim 1 where the pairs of signal generators and sensors are positioned on the circumference of the switch plate assembly.

3. The ignition distributor of claim 1 where the signal generators and sensors generate and receive Hall Effect signals.

4. The ignition distributor of claim 2 where the metal vanes on the interrupter are equally spaced around the circumference of the circular flange of the interrupter such that each vane is perpendicular to the circular flange.

5. The ignition distributor of claim 2 where the signal generators and sensors generate and receive Hall Effect signals.

6. The ignition distributor of claim 4 where the signal generators and sensors generate and receive Hall Effect signals.

* * * * *